(12) United States Patent
Chueh et al.

(10) Patent No.: US 11,366,495 B2
(45) Date of Patent: Jun. 21, 2022

(54) ELECTRONIC DEVICE

(71) Applicant: Acer Incorporated, New Taipei (TW)

(72) Inventors: Yen-Chou Chueh, New Taipei (TW);
Hui-Ping Sun, New Taipei (TW);
Wei-Chih Wang, New Taipei (TW)

(73) Assignee: Acer Incorporated, New Taipei (TW)

( * ) Notice: Subject to any disclaimer, the term of this patent is extended or adjusted under 35 U.S.C. 154(b) by 31 days.

(21) Appl. No.: 17/105,466

(22) Filed: Nov. 25, 2020

(65) Prior Publication Data

US 2021/0081002 A1 Mar. 18, 2021

Related U.S. Application Data

(63) Continuation of application No. 16/784,248, filed on Feb. 7, 2020, now Pat. No. 10,890,948.

(30) Foreign Application Priority Data

Jul. 3, 2019 (TW) .................................. 108208671

(51) Int. Cl.
*G06F 1/16* (2006.01)

(52) U.S. Cl.
CPC .......... *G06F 1/1652* (2013.01); *G06F 1/1616* (2013.01); *G06F 1/1641* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,572,272 B2* | 2/2017 | Lee | .................... | H05K 5/0021 |
| 9,844,251 B2* | 12/2017 | Lin | .................... | G06F 1/1652 |
| 10,111,346 B2* | 10/2018 | Seo | .................... | G06F 1/1643 |
| 10,297,785 B2* | 5/2019 | Ahn | .................... | H04M 1/0214 |
| 10,582,629 B2* | 3/2020 | Xu | .................... | H05K 5/0226 |
| 10,615,362 B2* | 4/2020 | Ahn | .................... | G06F 1/16 |
| 10,631,608 B2* | 4/2020 | Lin | .................... | G06F 1/1641 |
| 10,820,433 B2* | 10/2020 | Cha | .................... | H05K 5/0226 |
| 10,890,948 B1* | 1/2021 | Chueh | .................... | G06F 1/1681 |
| 10,993,338 B2* | 4/2021 | Cha | .................... | H05K 5/0226 |
| 11,003,217 B2* | 5/2021 | Cha | .................... | H04M 1/0216 |
| 11,212,379 B2* | 12/2021 | Baek | .................... | G06F 1/1652 |
| 2020/0033913 A1* | 1/2020 | Yang | .................... | G06F 1/1624 |
| 2020/0117233 A1* | 4/2020 | Ou | .................... | G06F 1/1652 |
| 2020/0170128 A1* | 5/2020 | Kim | .................... | G02F 1/13338 |
| 2021/0286408 A1* | 9/2021 | Chueh | .................... | G06F 1/1652 |
| 2021/0352813 A1* | 11/2021 | Cho | .................... | G06F 1/1681 |
| 2022/0019260 A1* | 1/2022 | Kang | .................... | G06F 1/1624 |
| 2022/0019261 A1* | 1/2022 | Kang | .................... | H01Q 1/243 |

* cited by examiner

*Primary Examiner* — Lisa Lea-Edmonds
(74) *Attorney, Agent, or Firm* — JCIPRNET

(57) ABSTRACT

An electronic device includes a first body, a second body, a rotating shaft connected with the first body and the second body, at least one driving member, a third body and a flexible display. The first body and the second body rotate relatively to be folded or unfolded via the rotating shaft. The driving member is movably pivoted to the rotating shaft. The third body is movably disposed at the second body, the third body is located on a moving path of the driving member, and the third body and the driving member rotate relative to the first body to be folded or unfolded along with the second body. The flexible display is disposed at the first body and the third body, and the driving member drives the third body to move close to or away from the first body in a rotating folding or unfolding process.

10 Claims, 11 Drawing Sheets

ELECTRONIC DEVICE

CROSS-REFERENCE TO RELATED APPLICATION

This application is a continuation application of and claims the priority benefit of a prior application Ser. No. 16/784,248, filed on Feb. 7, 2020, which claims the priority benefit of Taiwan application serial no. 108208671, filed on Jul. 3, 2019. The entirety of each of the above-mentioned patent applications is hereby incorporated by reference herein and made a part of this specification.

BACKGROUND

1. Technical Field

The present disclosure relates to an electronic device.

2. Description of Related Art

Along with progress of technologies, flexible display technologies have gradually become mature and are considered to have great development potential. Generally speaking, the flexible display technologies include electronic paper, flexible organic light-emitting diode (OLED) and the like. In addition, for adaptation to requirements of portable electronic devices on functions of bending, folding, extension and the like on display devices, application of the flexible display technologies to the portable electronic devices is diversified. Moreover, along with application of flexible materials to the field of electronic display, an electronic device may extend for display with a relatively large area, and may also be folded to be conveniently carried according to a requirement.

However, corresponding to extension and folding of a device mechanism on a flexible display device, a flexible display panel on the flexible display device may also have corresponding shape and size changes due to its flexibility, and for example, may be prolonged or shortened relative to the device mechanism due to different bending (flattening) degrees. Designing still based on a mechanism characteristic of an existing electronic device may not only bring inconvenience to use but also deviate the display panel from an original position to cause the condition of bulging, wrinkling and even separation from the mechanism. Therefore, there is an urgent need in the industry for improvements in a mechanism of an existing flexible display device for adaptation to technology development trends and market requirements.

SUMMARY

The present disclosure provides an electronic device, of which a body structure may correspondingly extend and retract for adaptation to a folded state or an unfolded state of a flexible display.

An electronic device of the present disclosure includes a first body, a second body, a rotating shaft, at least one driving member, a third body and a flexible display. The rotating shaft is connected with the first body and the second body, and the first body and the second body rotate relatively to be folded or unfolded via the rotating shaft. The driving member is movably pivoted to the rotating shaft. The third body is movably disposed at the second body, the third body is located on a moving path of the driving member, and the third body and the driving member rotate relative to the first body to be folded or unfolded along with the second body. The flexible display is disposed at the first body and the third body, and the driving member drives the third body to move close to or away from the first body in a rotating folding or unfolding process.

Based on the above, according to the electronic device, the third body is movably disposed at the second body and folded or unfolded relative to the first body along with it, the driving member is movably disposed at the rotating shaft, and meanwhile, the third body is located on the moving path of the driving member, so that, when the third body rotates relative to the first body to be folded or unfolded along with the second body, the third body may be driven by the driving member to move away from or close to the first body to generate relative extension and retraction movement between the first body and the third body. In such a manner, the flexible display disposed at the first body and the third body may smoothly be switched between a folded state and an unfolded state along with the extension and retraction movement between the bodies, size differences, generated by state switching, of the flexible display are avoided, and the problems of wrinkling and even separation of the flexible display are further solved.

In order to make the aforementioned features and advantages of the present invention comprehensible, embodiments accompanied with accompanying drawings are described in detail below.

DESCRIPTION OF THE EMBODIMENTS

Figure 1A:
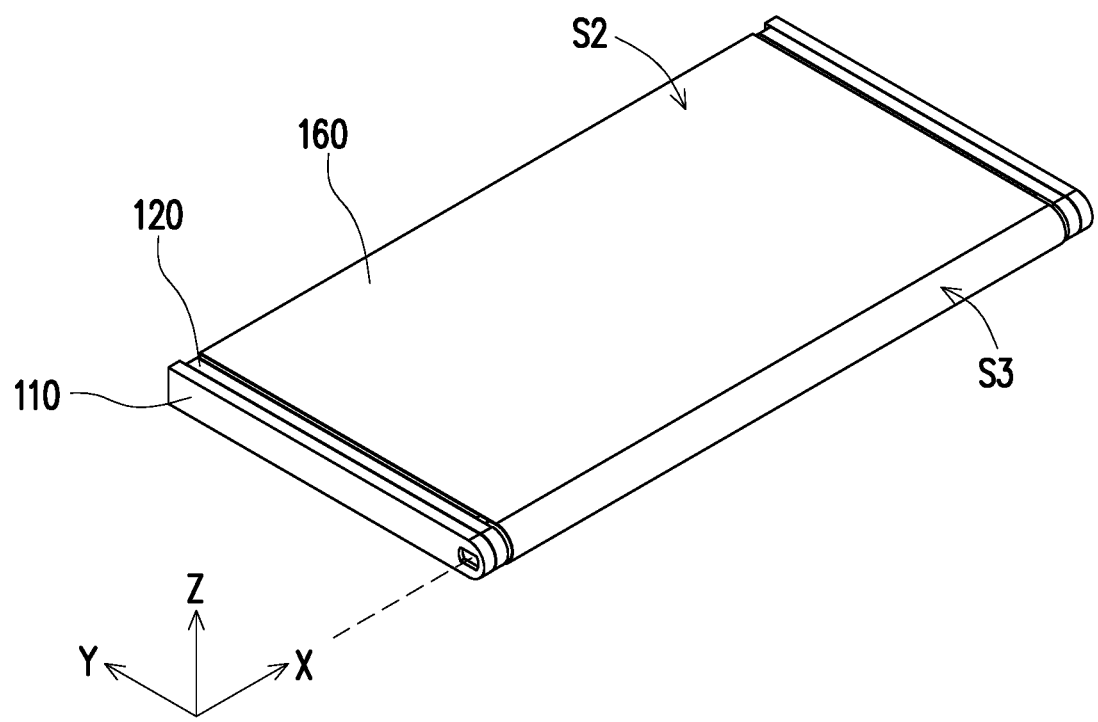
FIG. 1A is a schematic diagram of an electronic device according to an embodiment of the present disclosure.
Figure 1B:
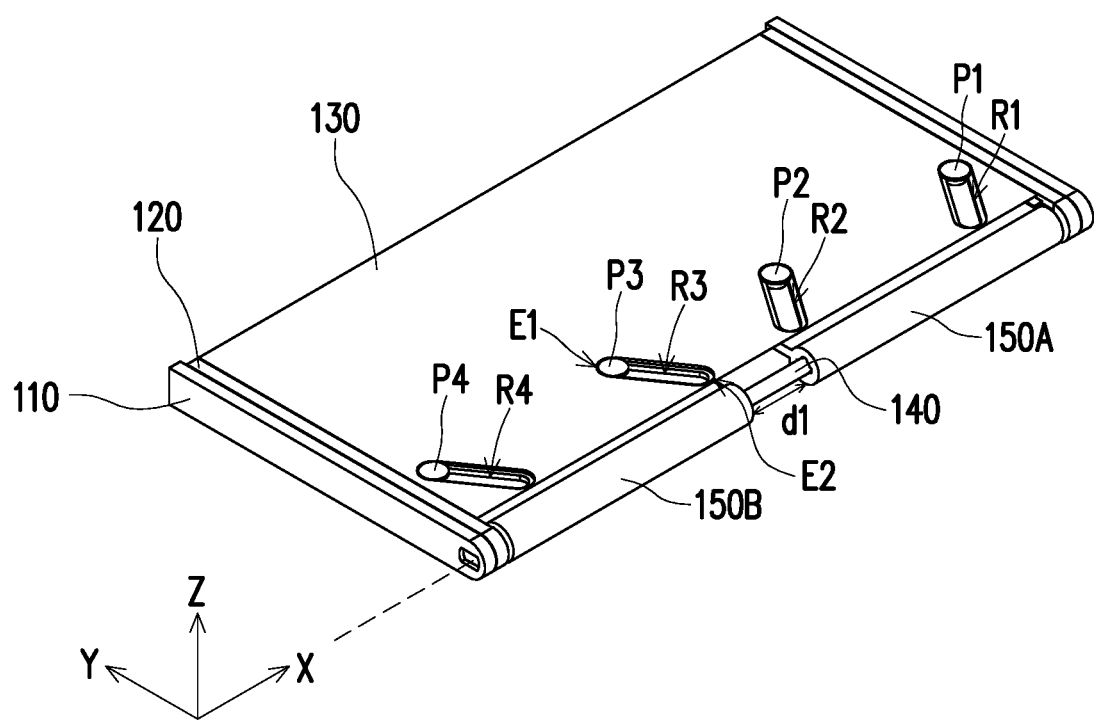
FIG. 1B is a schematic diagram of part of components of the electronic device of FIG. 1A.
Figure 1C:
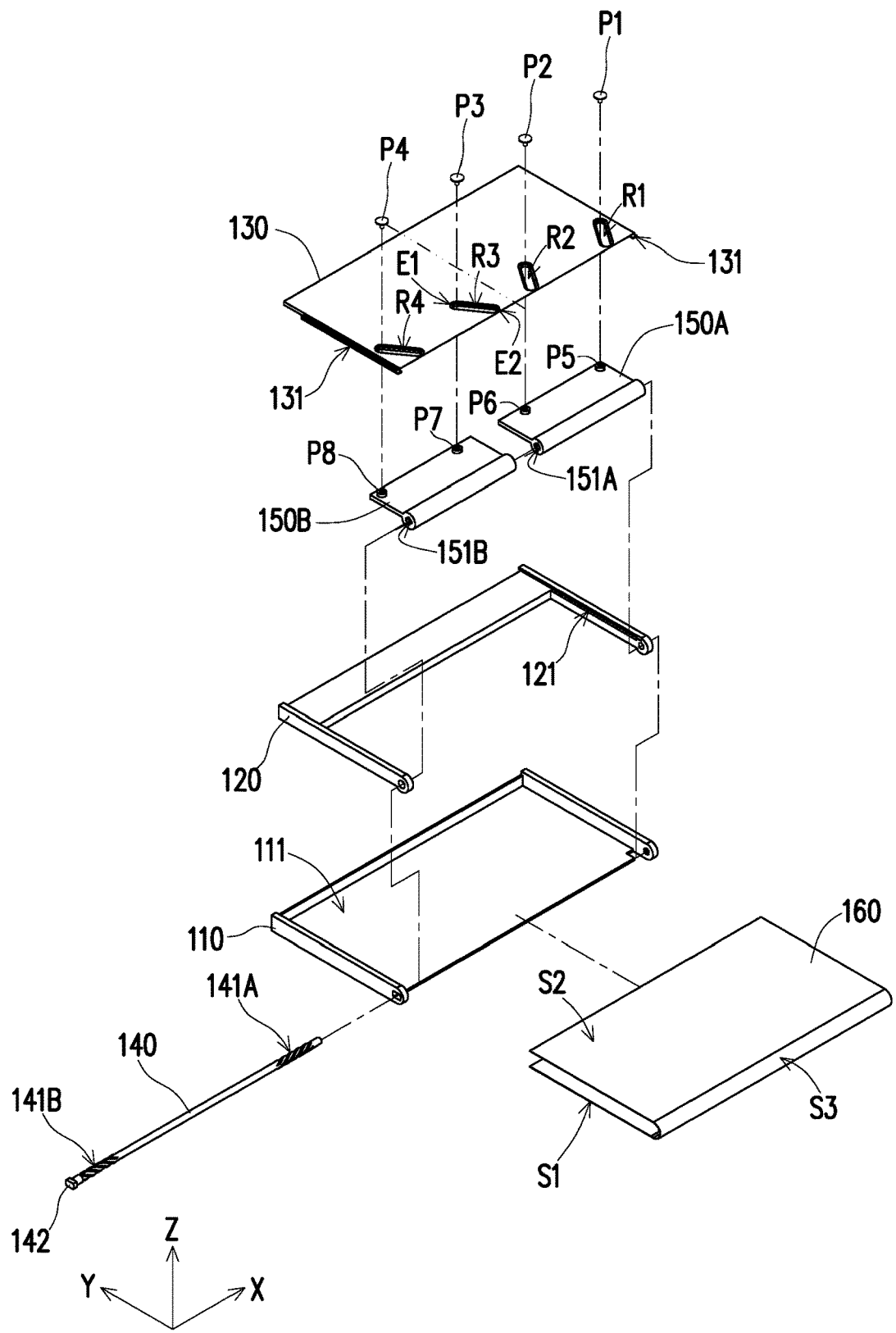
FIG. 1C is an exploded view of the electronic device of FIG. 1A.

FIG. 1A is a schematic diagram of an electronic device according to an embodiment of the present disclosure. FIG. 1B is a schematic diagram of part of components of the electronic device of FIG. 1A. FIG. 1C is an exploded view of the electronic device of FIG. 1A. Meanwhile, a cartesian coordinate X-Y-Z is provided to facilitate component description. Referring to FIG. 1A to FIG. 1C, in this embodiment, the electronic device 100 includes a first body 110, a second body 120, a rotating shaft 140, driving members 150A and 150B, a third body 130 and a flexible display 160. The rotating shaft 140 is connected with the first body 110 and the second body 120, and the first body 110 and the second body 120 rotate relatively to be folded or unfolded via the rotating shaft 140. The driving members 150A and 150B are movably pivoted to the rotating shaft 140. The third body 130 is movably disposed at the second body 120, the third body 130 is located on a moving path of the driving members 150A and 150B, and the third body 130 and the driving member 150A and 150B rotate relative to the first body 110 to be folded or unfolded along with the second body 120. The flexible display 160 is disposed at the first body 110 and the third body 130, and the driving members 150A and 150B drive the third body 130 to move close to or away from the first body 110 in a rotating folding or unfolding process.

Specifically, referring to FIG. 1B and FIG. 1C, compared with FIG. 1A and FIG. 1C, the flexible display 160 is omitted in FIG. 1B to clearly recognize other components covered by it. In this embodiment, the electronic device 100 in FIG. 1A to FIG. 1C is in such a state that the bodies are folded and the flexible display 160 is also folded. The first body 110 has a recess 111, and the second body 120, the third body 130 and the driving members 150A and 150B are accommodated in the recess 111 and covered by the flexible display 160 in a folded state.

The rotating shaft 140 penetrates through the first body 110 and forms different connection relationships with the second body 120 and the driving members 150A and 150B. For the first body 110 and the second body 120, when the rotating shaft 140 is fixedly disposed at the first body 110 via a protrusion 142 to disable them to rotate relatively, the second body 120 is pivoted to an unthreaded position on the rotating shaft 140, and thus the second body 120 may form a pivoting relationship with the first body 110 via the rotating shaft 140, namely the second body 120 may be pivoted relative to the first body 110 about an X axis via the rotating shaft 140.

For the driving members 150A and 150B, the rotating shaft 140 has a first external thread 141A and a second external thread 141B, the driving members 150A and 150B have a first internal thread 151A and a second internal thread 151B respectively, the first external thread 141A is adapted to the first internal thread 151A, and the second external thread 141B is adapted to the second internal thread 151B. Therefore, the driving members 150A and 150B may also move along the X axis at the same time when the driving members 150A and 150B rotate relative to the rotating shaft 140 about the X axis via the thread structures.

Here, a spiral direction of the first external thread 141A is opposite to a spiral direction of the second external thread 141B, and thus an effect on the driving members 150A and 150B is that the driving members 150A and 150B, when rotating in the same direction, may also move close to or away from each other.

In addition, as shown in FIG. 1B and FIG. 1C, the third body 130 has a guide portion 131 for adaptation to a track 121 of the second body 120, and thus the third body 130 may move relative to the second body 120 along a Y axis. Moreover, as shown in FIG. 1C, the driving members 150A and 150B have column bodies P5 to P8 correspondingly matched with riveting pieces P1 to P4 to form multiple guide columns respectively, the third body 130 has guide slots R1 to R4, and the multiple guide columns formed by the column bodies P5 to P8 and the riveting pieces P1 to P4 are movably coupled to the guide slots R1 to R4 respectively. Accordingly, when the driving members 150A and 150B move along the X axis, the third body 130 may be driven by matching of the guide columns and the guide slots R1 to R4 to slide relative to the second body 120.

It is to be noted herein that, although a movement axial direction of the third body 130 relative to the second body 120 is the Y axis, as shown in the figures, it may be expected that, when the third body 130 is pivoted relative to the first body 110 along with the second body 120, the movement axial direction of the third body 130 relative to the second body 120 may also change correspondingly but it is constant that the movement axial direction may still enable the third body 130 to move close to or away from the rotating shaft 140.

Based on corresponding configurations of the related components, when the third body 130 rotates relative to the first body about the X axis along with the second body 120, the driving members 150A and 150B may also move along the X axis while rotating, which may further move the guide columns along the guide slots R1 to R4 and further drive the third body 130 to slide relative to the second body 120.

Figure 2A:
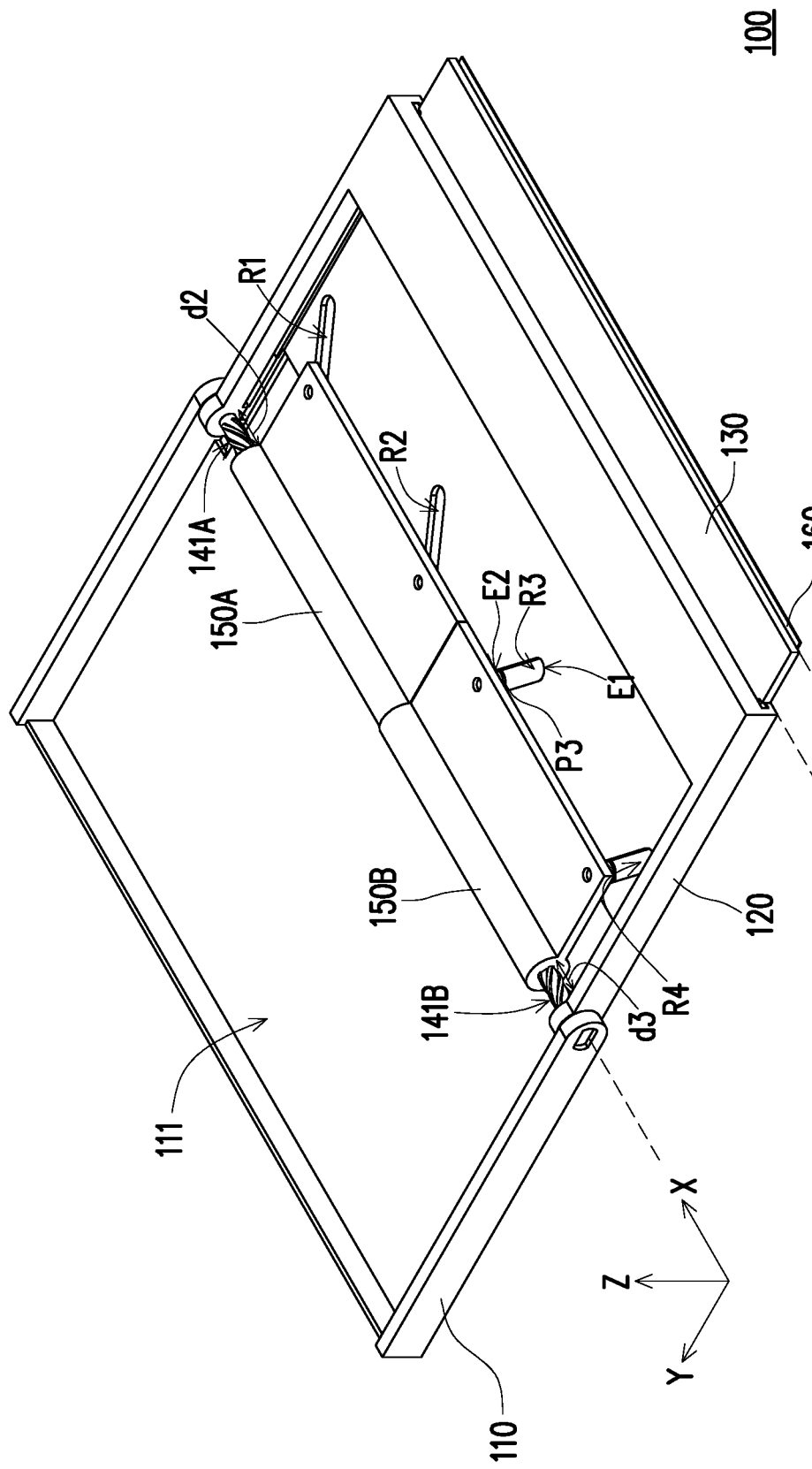
FIG. 2A is a schematic diagram of the electronic device of FIG. 1A in another state.
Figure 2B:
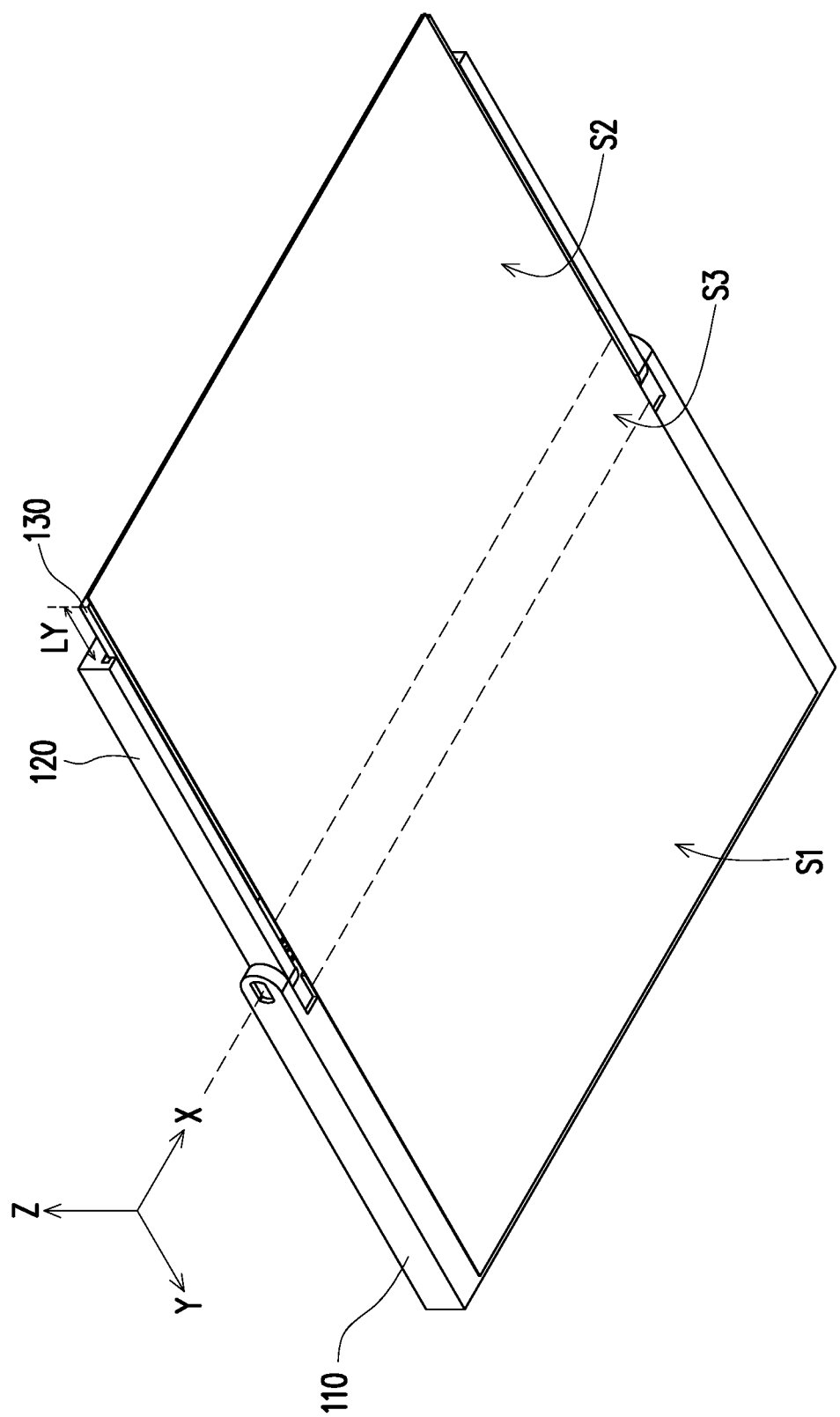
FIG. 2B is the electronic device of FIG. 2A at another viewing angle.
Figure 2C:
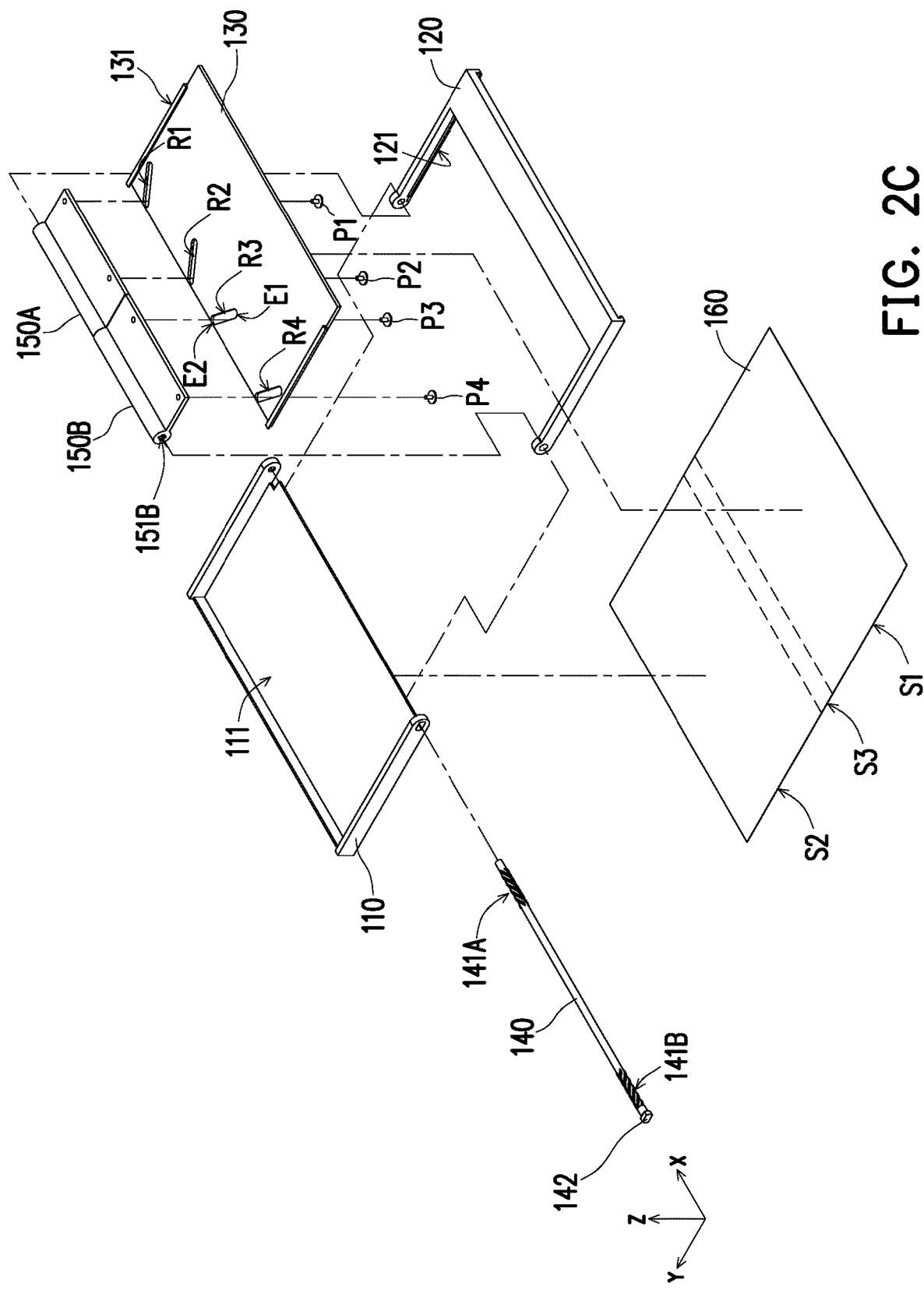
FIG. 2C is an exploded view of the electronic device of FIG. 2A.

FIG. 2A is a schematic diagram of the electronic device of FIG. 1A in another state. FIG. 2B is the electronic device of FIG. 2A at another viewing angle. FIG. 2C is an exploded view of the electronic device of FIG. 2A. Referring to FIG. 2A to FIG. 2C, the second body 120 is pivoted and unfolded relative to the first body 110 and the flexible display 160 is in an unfolded (flattened) state in the same plane. In such a case, the first body 110, the second body 120, the third body 130 and the driving members 150A and 150B are located on an opposite surface of a display surface of the flexible display 160.

Figure 1D:
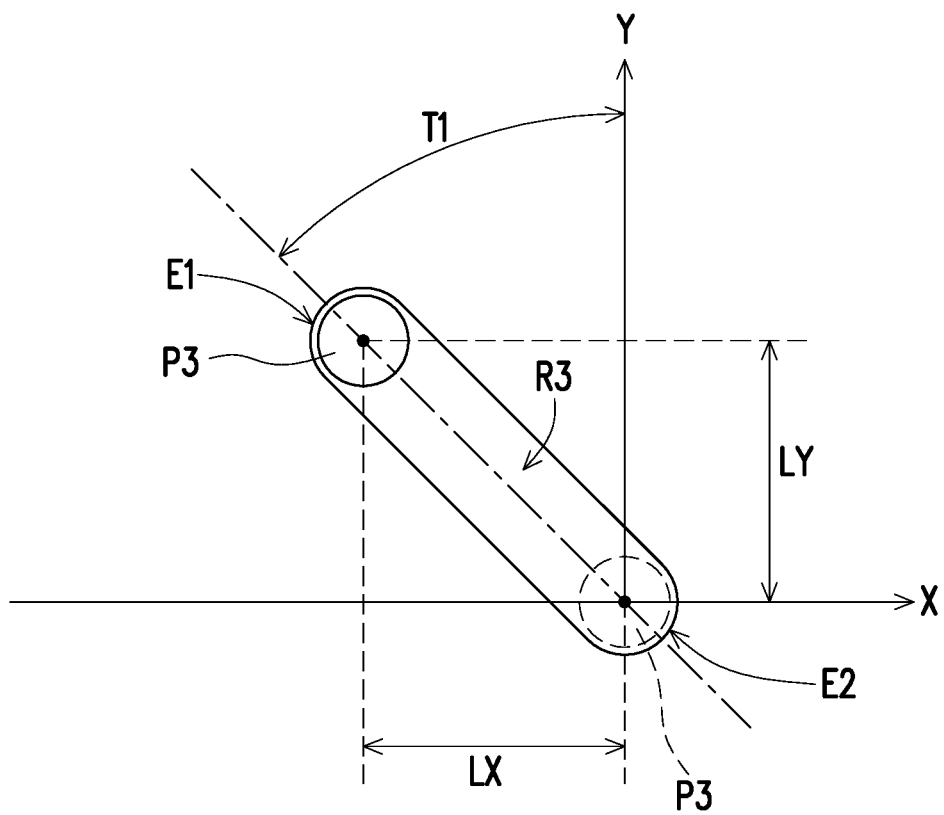
FIG. 1D is a simple local schematic diagram of the electronic device of FIG. 1B.

Moreover, referring to FIG. 1B to FIG. 1D, in this embodiment, the third body 130 has four guide slots R1 to R4 corresponding to multiple guide columns (riveting pieces P1 to P4 are matched with column bodies P5 to P8) on the pair of driving members 150A and 150B, and positions of these guide slots R1 to R4 form mirror symmetry relative to a centreline of the third body 130 for correspondence to a movement mode of the driving members 150A and 150B. As described above, the driving members 150A and 150B move close to or away from each other in a process of rotating in the same direction, so that, when the driving members 150A and 150B are switched from a state shown in FIG. 1B to a state shown in FIG. 2A to move close to each other, the third body 130 may be pushed out of the second body 120 by the driving members 150A and 150B along the Y axis due to an arrangement trend of the guide slots R1 to R4, and the effect that the third body 130 extends relative to the second body 120 is achieved.

Furthermore, by taking the guide slot R3 as an example, as described above, the guide column (formed by matching the column body P7 and the riveting piece P3) is movably coupled to the guide slot R3, that is, the guide column may move between two opposite end portions E1 and E2 of the guide slot R3. Here, the Y axis is considered as the movement axial direction of the third body 130 relative to the second body 120, the movement axial direction is orthogonal to an axial direction (the X axis) of the rotating shaft 140, the guide slot R3 is inclined relative to the Y axis, and an included angle T1 between the guide slot R3 and the Y axis is shown in FIG. 1D. Therefore, the driving member 150B (considered as a component with the guide column) may move along the X axis to drive the third body 130 to move relative to the second body 120 along the movement axial direction (the Y axis) due to a structural adaptation relationship between the guide column and the guide slot R3. Switching of a state in FIG. 1A to FIG. 1D to a state in FIG. 2A to FIG. 2C is equivalent to movement of the guide column from the end portion E1 of the guide slot R3 to the end portion E2 of the guide slot R3, as shown in FIG. 2A.

Here, as shown in FIG. 1B, in the folded state, the driving members 150A and 150B are kept at a distance d1, and a side edge, far away from the rotating shaft 140, of the third body 130 is substantially aligned with a side edge, far away from the rotating shaft 140, of the second body 120. Once being switched to the unfolded state in FIG. 2A, the driving members 150A and 150B move close to and contact with each other, the driving members 150A and 150B are further kept at distances d2 and d3 relative to the second body 120 respectively, and thus it is apparent that d1=d2+d3. Corresponding to FIG. 1D, since the guide slot (for example, the guide slot R3) forms the included angle T1 relative to the Y axis, an orthogonal projection size LX of a moving path of the guide column from E1 to E2 on the X axis may be considered as a moving distance of the driving member 150B along the X axis (the same moving distance in the same direction also exists for the guide slot R4). Similarly, an orthogonal projection size LX of the guide slot R1 or R3 on the X axis is considered as a moving distance of the driving member 150A along the X axis. Moreover, for example, still for the guide slot R3, an orthogonal projection size LY thereof on the Y axis represents a moving-out distance of the third body 130 relative to the second body 120, as shown in FIG. 2A and FIG. 2B. In this embodiment, the driving members 150A and 150B equally divides the distance d1, so that it is equivalent that d1=LX+LX, that is, d2=LX and d3=LX.

Figure 3A:
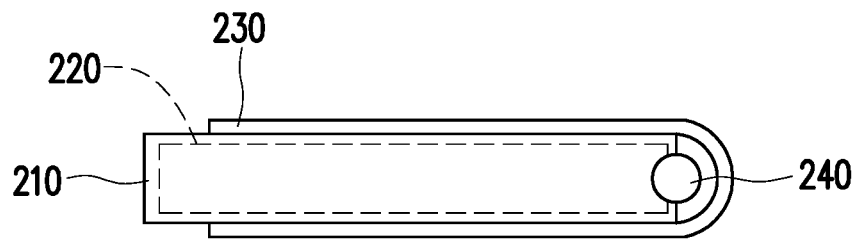
FIG. 3A and FIG. 3B are schematic diagrams of state switching of an existing electronic device.
Figure 3B:
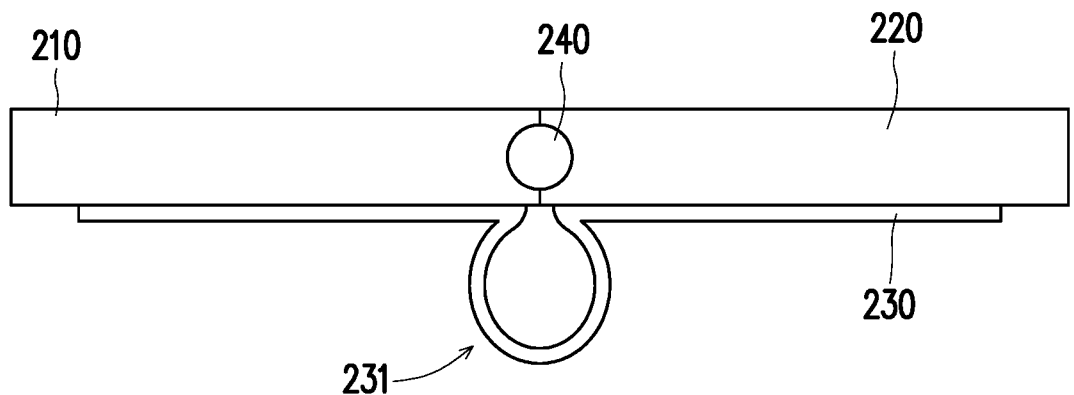

FIG. 3A and FIG. 3B are schematic diagrams of state switching of an existing electronic device. Referring to FIG. 3A and FIG. 3B simultaneously, in the existing electronic device 200, a first body 210 and a second body 220 are pivoted to be folded or unfolded via a rotating shaft 240, and a flexible display 230 is disposed on the first body 210 and the second body 220. However, as shown in FIG. 3B, since a fixed pivoting mode is adopted, the flexible display 230 may form a bulge 231 shown in FIG. 3B due to a size difference caused by a difference in the folded state and the unfolded state, which is unfavourable for arrangement and operation of the flexible display 230 and even may cause damage to it.

In view of this, as shown in FIG. 1A to FIG. 1D and FIG. 2A to FIG. 2C, in this embodiment, the third body 130 may locally move into or out of the second body 120 in a rotating process, namely overcoming the aforementioned size difference. That is, orthogonal projection sizes LY of the guide slots R1 to R4 on the Y axis in FIG. 1D, FIG. 2A and FIG. 2B are the moving-out distance of the third body 130 relative to the second body 120 and, furthermore, equivalently overcome the size difference forming the bulge 231 of the flexible display 230 in FIG. 3B (namely the bulge 231 of the flexible display 230 in FIG. 3B may be flattened because the moving-out distance for additional extension of the third body 130 is equal to LY in this embodiment).

Referring to FIG. 1A, FIG. 1C, FIG. 2B and FIG. 2C, in this embodiment, the display surface of the flexible display 160 comprises a first portion S1, a second portion S2 and a third portion S3. The first portion S1 is disposed at the first body 110, the second portion S2 is disposed at the second body 120, and the third portion S3 is abutted between the first portion S1 and the second portion S2 and connected with no component to ensure smooth switching between the folded state and the unfolded state. Furthermore, as shown in FIG. 3A and FIG. 3B, the flexible display 230 may have the size difference between the folded state and the unfolded state, and thus, for the flexible display 160, a bulge (for example, the aforementioned bulge 231) may be formed at the third portion S3. Therefore, it is necessary to drive the third body 130 to move out of the second body 120 to achieve an extension effect when the flexible display 160 is switched from the folded state to the unfolded state, which is equivalent to that the bulge 231 of the flexible display 230 is stretched to achieve a flattening effect shown in FIG. 2B on the unfolded flexible display 160.

Figure 4A:
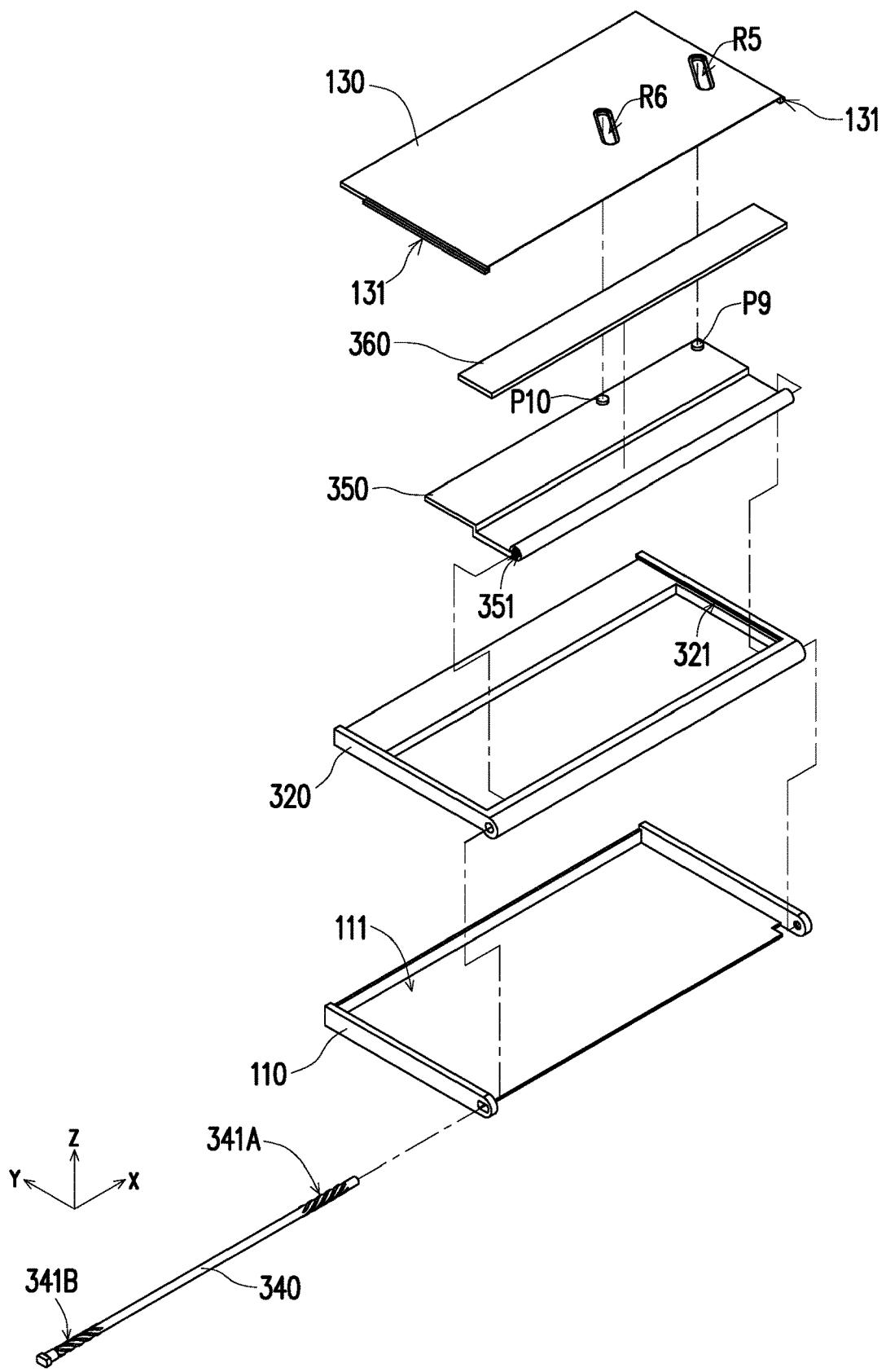
FIG. 4A is an exploded view of an electronic device according to another embodiment of the present disclosure.
Figure 4B:
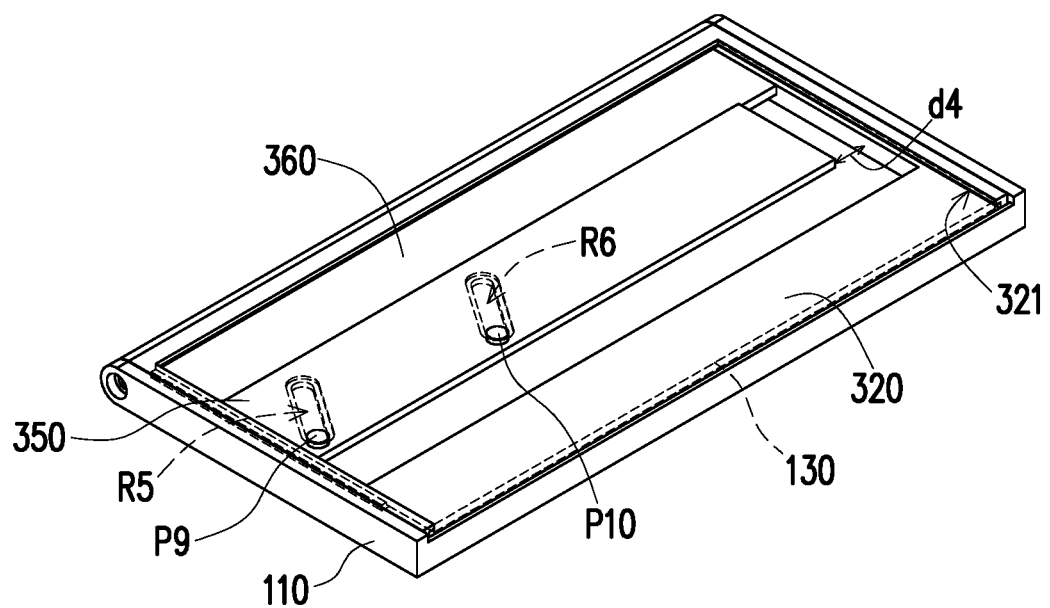
FIG. 4B is a schematic diagram of part of components of the electronic device of FIG. 4A after assembling.
Figure 4C:
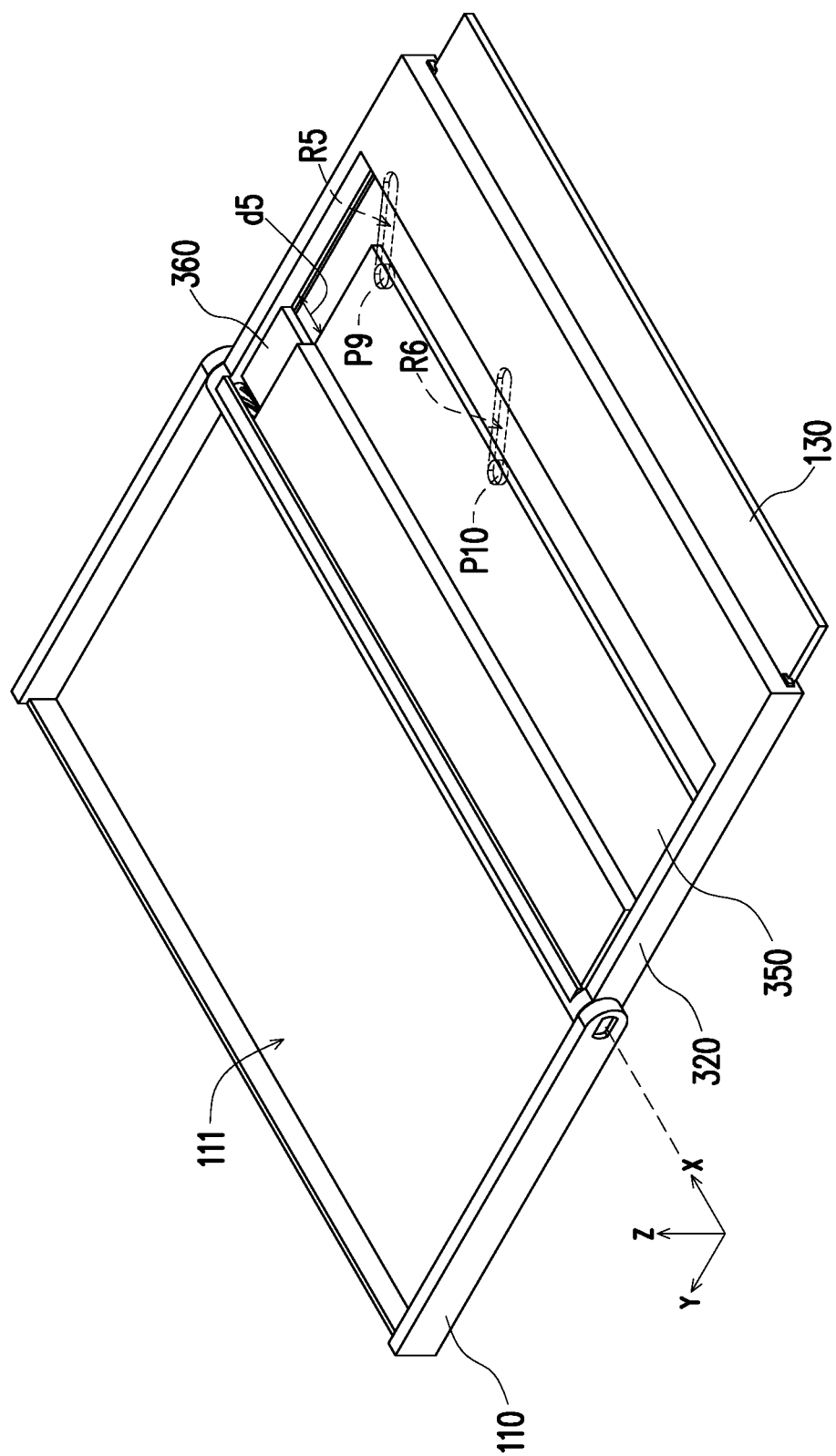
FIG. 4C is the electronic device of FIG. 4B at another viewing angle.

FIG. 4A is an exploded view of an electronic device according to another embodiment of the present disclosure. FIG. 4B is a schematic diagram of part of components of the electronic device of FIG. 4A after assembling. FIG. 4C illustrates the electronic device of FIG. 4B at another viewing angle, and FIG. 4C is a schematic diagram of the electronic device in an unfolded state different from a folded state shown in FIG. 4A and FIG. 4B. It is also to be noted that a flexible display is omitted in this embodiment to facilitate recognition of related components covered by it. Referring to FIG. 4A to FIG. 4C simultaneously, unlike a pair of driving members 150A and 150B configured to drive the third body 130 in the aforementioned embodiment, a single driving member 350 is configured to drive the third body 130 in this embodiment.

Furthermore, the electronic device of this embodiment includes a first body 110, a second body 320, a third body 130, a rotating shaft 340, a driving member 350 and a retaining member 360. The first body 110 and the second body 320 are pivoted to each other via the rotating shaft 340. The third body 130 is arranged at the second body 320 in a sliding manner by matching of a guide portion 131 and a track 321. The driving member 350 has an internal thread 351 for adaptation to a first external thread 341A and a second external thread 341B of the rotating shaft 340. It is to be noted that a spiral direction of the first external thread 341A is the same as a spiral direction of the second external thread 341B in this embodiment. Here, when the driving member 350 rotates relative to the first body 110 along with the second body 320, the driving member 350 may move relative to the second body 320 along an X axis by matching of the thread structures. Moreover, the retaining member 360 is disposed at the second body 320 for retaining during movement of the driving member 350.

As shown in FIG. 4B and FIG. 4C, in the folded state, the driving member 350 is kept at a distance d4 relative to one side of the second body 320, and when being switched to the unfolded state, the driving member 350 moves along the X axis to be kept at a distance d5 relative to the other side of the second body 320 instead. Here, the distance d4 is equal to the distance d5.

Like the third body 130 of the aforementioned embodiment, the third body 130 of this embodiment also has guide slots R5 and R6. Due to matching with only one driving member 350, the requirement that the driving member 350 drives the third body 130 to move out of or into the second body 320 may be met only via the guide slots R5 and R6 in the same direction. In this embodiment, since a driving manner of the driving member 350 is similar to that in the aforementioned embodiment and it is movably coupled to the guide slots R5 and R6 via guide columns P9 and P10 to achieve an effect the same as that in the aforementioned embodiment on the third body 130, elaborations are omitted.

Based on the above, according to the electronic device in the aforementioned embodiments of the present disclosure, the third body is movably disposed at the second body and folded or unfolded relative to the first body along with it, the driving member is movably disposed at the rotating shaft, and meanwhile, the third body is located on the moving path of the driving member, so that, when the third body rotates relative to the first body to be folded or unfolded along with the second body, the third body may be driven by the driving member to move away from or close to the first body to generate relative extension and retraction movement between the first body and the third body. In such a manner, the flexible display disposed at the first body and the third body may smoothly be switched between a folded state and an unfolded state along with the extension and retraction movement between the bodies, size differences, generated by state switching, of the flexible display are avoided, and the problems of wrinkling and even separation of the flexible display are further solved.

The present disclosure has been disclosed above with the embodiments but is not limited thereto. Those of ordinary skill in the art may make some modifications and embellishments without departing from the spirit and scope of the present disclosure. Therefore, the scope of protection of the present disclosure should be defined by the appended claims.

What is claimed is:

1. An electronic device, comprising:
   a first body;
   a second body;
   a rotating shaft, connected with the first body and the second body, the first body and the second body rotating relatively to be folded or unfolded via the rotating shaft;
   at least one driving member, movably pivoted to the rotating shaft;
   a third body, slidably coupled to a rail of the second body, the driving member slidably coupled to another rail of the third body, the third body being located on a moving path of the driving member, the third body and the driving member rotating relative to the first body to be folded or unfolded along with the second body, and the coupled third body, the second body, and the driving member rotating relative to the first body via the rotating shaft; and
   a flexible display, disposed at the first body and the third body, wherein the driving member drives the third body to move close to or away from the first body in a rotating folding or unfolding process.

2. The electronic device according to claim 1, wherein, when the third body rotates to the folded state relative to the first body along with the second body, the third body, the driving member and the second body are accommodated in a recess of the first body, and part of the first body, the third body, the driving member and the second body are covered by the flexible display in the folded state; and when the third body rotates to the unfolded state relative to the first body along with the second body, the flexible display is unfolded into a plane, and the first body, the second body, the third body and the driving member are located on an opposite surface of a display surface of the flexible display.

3. The electronic device according to claim 1, wherein the rotating shaft comprises an external thread, the driving member comprises an internal thread, the external thread is adapted to the internal thread, and the driving member, when rotating relative to the rotating shaft, moves along an axial direction of the rotating shaft.

4. The electronic device according to claim 3, wherein the third body comprises at least one guide slot or at least one guide column, the driving member comprises at least one guide column or at least one guide slot, the guide column is movably coupled to the guide slot, the third body moves relative to the second body along a movement axial direction, the guide slot is inclined relative to the movement axial direction, the movement axial direction is orthogonal to the axial direction of the rotating shaft, and the driving member moves along the axial direction of the rotating shaft to drive the third body to move close to or away from the first body along the movement axial direction.

5. The electronic device according to claim 4, wherein the flexible display comprises a folded state and an unfolded state along with relative folding and unfolding of the third body and the first body, a size difference exists for a size of the flexible display along the movement axial direction between the folded state and the unfolded state, and the size difference is equal to an orthogonal projection size of the guide slot in the movement axial direction.

6. The electronic device according to claim 5, wherein the flexible display comprises a first portion, a second portion and a third portion, the first portion is disposed at the first body, the second portion is disposed at the third body, the third portion is abutted between the first portion and the second portion, and the size difference exists for the third portion between the folded state and the unfolded state.

7. The electronic device according to claim 1, wherein the rotating shaft comprises a first external thread and a second external thread, the electronic device comprises a first driving member and a second driving member, the first driving member comprises a first internal thread, the second driving member comprises a second internal thread, the first external thread is adapted to the first internal thread, the second external thread is adapted to the second internal thread, and the first driving member and the second driving member, when rotating relative to the rotating shaft, move close to or away from each other along the axial direction of the rotating shaft.

8. The electronic device according to claim 7, wherein the third body comprises at least one pair of guide slots, the first driving member and the second driving member comprise at least one pair of guide columns respectively, the pair of guide columns is movably coupled to the pair of guide slots, the third body moves relative to the second body along a movement axial direction, the pair of guide slots is symmetrically disposed relative to the movement axial direction, each guide slot is inclined relative to the movement axial direction, the movement axial direction is orthogonal to the axial direction of the rotating shaft, and the first driving member and the second driving member move along the axial direction of the rotating shaft to drive the third body to move close to or away from the first body along the movement axial direction.

9. The electronic device according to claim 7, wherein a spiral direction of the first external thread is opposite to a spiral direction of the second external thread.

10. The electronic device according to claim 7, wherein the spiral direction of the first external thread is the same as the spiral direction of the second external thread.

* * * * *